United States Patent [19]

Halasz

[11] 4,372,773
[45] Feb. 8, 1983

[54] METHOD FOR MAKING INK JET WRITING DEVICES

[75] Inventor: Laszlo Halasz, Brecksville, Ohio

[73] Assignee: Gould Inc., Rolling Meadows, Ill.

[21] Appl. No.: 41,841

[22] Filed: May 23, 1979

[51] Int. Cl.³ ............................................. C03B 23/08
[52] U.S. Cl. ....................................... 65/108; 65/110; 65/270; 65/272; 65/285
[58] Field of Search ................. 65/108, 110, 270, 272, 65/285

[56] References Cited

U.S. PATENT DOCUMENTS

| | | | |
|---|---|---|---|
| 1,888,635 | 11/1932 | Koenig | 65/108 X |
| 2,582,818 | 1/1952 | Coby | 65/110 X |
| 3,320,012 | 5/1967 | Anderson | 65/270 X |
| 3,343,934 | 9/1967 | Rexford | 65/108 X |

*Primary Examiner*—Arthur D. Kellogg
*Attorney, Agent, or Firm*—John R. Garrett; Edward E. Sachs

[57] ABSTRACT

A method is disclosed for making capillary glass liners for use in ink jet writing devices. The capillary glass blanks are suspended within a heating coil which melts the glass locally so that the blank stretches to form two well defined jet liner nozzles. Liners with inlet and outlet orifices and with bent or angled outlet nozzles are also made.

3 Claims, 7 Drawing Figures

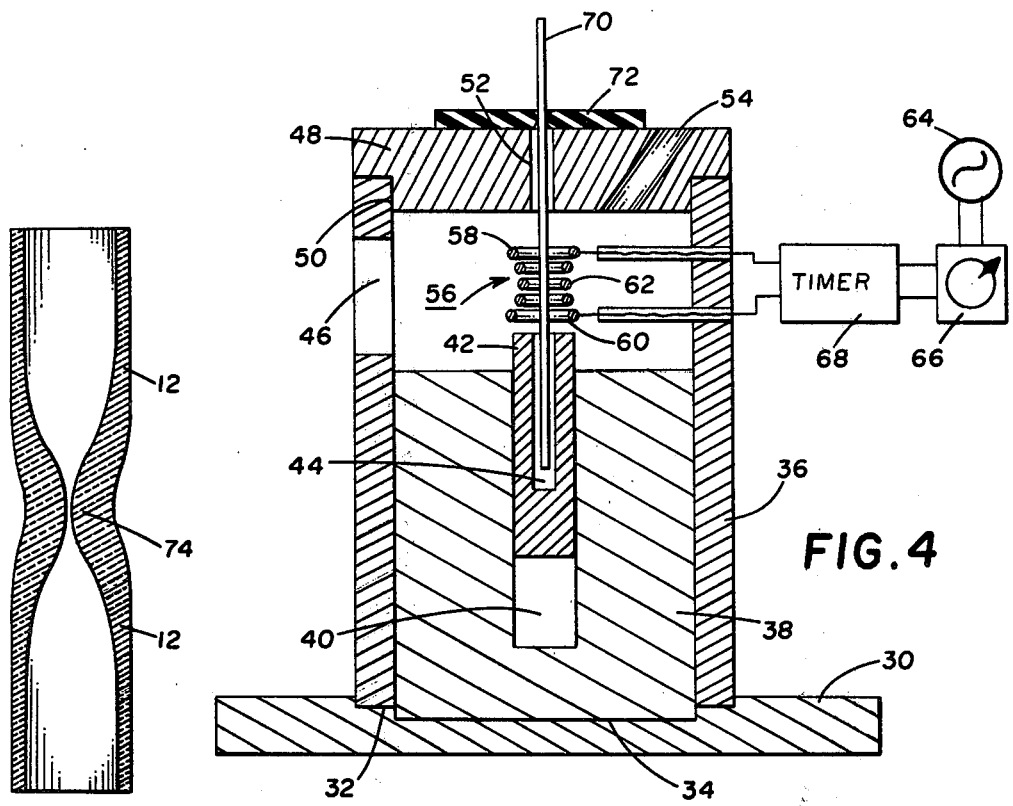
FIG. 4
FIG. 4a
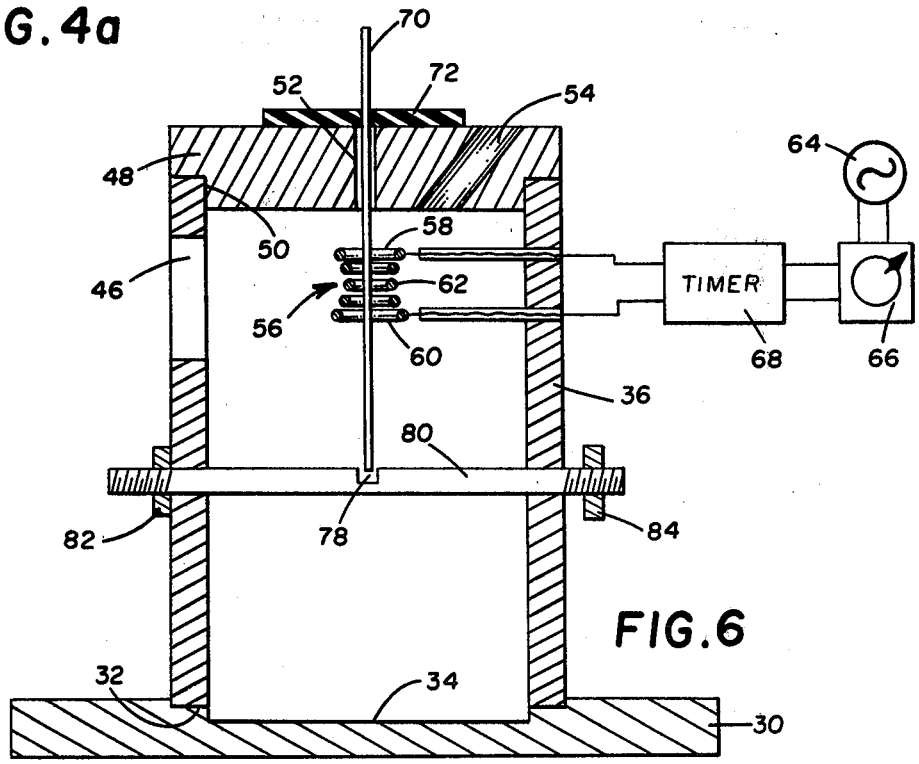
FIG. 6

METHOD FOR MAKING INK JET WRITING DEVICES

BACKGROUND OF THE INVENTION

Starting in the early 1960's a unique printing technology has developed known generally as ink jet printing. The first devices of this type produced a continuous stream of tiny ink droplets, some of which were electrostatically deflected to desired locations on an adjacent record medium and others of which were similarly deflected to an ink collection device of some sort, usually for reuse. U.S. Pat. No. 3,298,030 issued to Lewis and Brown and U.S. Pat. No. 3,596,275 issued to Sweet disclose early versions of such continuous streaming ink jet printers. In the late 1960's an improved type of ink jet technology was developed in which tiny droplets were produced only when needed and then directed to their assigned locations on an adjacent record medium, thus eliminating the need for any ink collection system for unused droplets. Moreover, when arrays of such jets are used, electrostatic deflection of the droplets is not required, either to print alphanumerics or other images, or to remove unneeded droplets. Single jets, however, still require electrostatic deflection to print alphanumerics. U.S. Pat. No. 3,683,212 issued to Zoltan and U.S. Pat. No. 3,832,579 issued to Arndt disclose such drop-on-demand ink jet printers.

While the drop-on demand technology represented a substantial simplification of the earlier continuous streaming ink jet printers, the reduction in complexity was achieved at some cost in the form of reduced speed of printing, particularly where electrostatic deflection is used. Printing speeds of a few KHz for alphanumerics are achievable with known drop-on-demand devices using deflection; however, reliable operation at speeds approaching 10 KHz and higher for alphanumerics has been difficult to achieve when electrostatic deflection is used. Where more continuous operation is feasible, higher speed reliability is rather good.

The previously mentioned Zoltan and Arndt patents discuss the desirability of providing a relatively high acoustic impedance looking from the ceramic transducer region of the ink jet into the supply conduit leading to the transducer region, so as to minimize the part of each transducer pulse inevitably used to drive ink from the transducer portion toward the reservoir. Analysis shows that perhaps 70% of the ink is ejected as a droplet, the balance being driven toward the reservoir. While operation without such a higher impedance is claimed by Zoltan, actual experience has shown that voltage pulses as high as 120 volts are required to produce droplets reliably and that frequency response is limited, particularly with electrostatic deflection, being reliable up to about 2.0 KHz. Even without deflection, reliable performance above 4 KHz has been hard to achieve. To improve performance, supply conduits have been carefully sized and their material chosen to provide appropriate inlet impedance. Operating voltages as low as 80 volts have been achieved by this means with good frequency response up to about 2 KHz, with deflection. However, the increased inlet impedance tends to slow down the refill of the jet following each pulse, so that operation at higher frequencies may result in depriming of the jet due to failure to refill quickly enough to be ready for the next pulse of the transducer. To offset partially these effects, the Zoltan type jets have been made with typical lengths of about one-half inch for the transducer and three-quarters inch for the jet liner. The requirements for particular inlet impedances and the overall jet size have created design complications for some applications, such as parallel and diverged arrays of jets.

Various forms of drop-on-demand ink jets have been disclosed heretofore, but glass lined capillary jets of the general type shown in FIG. 4 of the Zoltan patent have received considerable attention due to the corrosion resistance of the glass liner. Making such ink jets has presented a peculiar set of problems several of which are solved by the inventions disclosed in copending Ser. No. 886,882, filed Mar. 15, 1978 now abandoned by the present applicant under the title Ink Jet Pen Assembly and Method. Another problem encountered in making glass lined jets concerns the capillary glass liners themselves, which must conform to rather rigid standards regarding geometry and material in order for the resultant jets to function properly. An acceptable material such as low lead KG12 glass made by Drummond Scientific Company of Broomall, Pa., has been known for some time; however, the control of jet geometry in the tiny liners has proven difficult, with a high reject rate and attendant high cost. A reliable method and means for making the glass liners has been lacking in the art.

Drop-on-demand ink jets and continuous streaming ink jets known in the prior art, produce very small ink droplets, typically in the range of 0.003 to 0.004 inch for drop on demand, and somewhat smaller for continuous streaming, based on applicant's experience. Such tiny drop sizes present problems when a continuous line is to be made by an ink jet imaging device; thus, considerable interest has been shown in reliably producing larger droplets.

OBJECTS OF THE INVENTION

An object of the invention is to provide an improved drop-on-demand ink jet structure having improved operating capabilities at higher operating frequencies.

Another object of the invention is to provide an improved drop-on-demand ink jet structure having a unique inlet geometry which obviates any need for carefully selected acoustic impedance of the inlet conduit leading to the jet.

Another object of the invention is to provide an improved method and apparatus for making glass capillary liners for use in ink jet devices.

Another object of the invention is to provide an improved method and apparatus for making glass capillary liners having angled outlet nozzles adapted to eject ink droplets to locations spaced laterally from the primary axis of the jet.

Yet another object of the invention is to provide an improved drop-on-demand ink jet structure capable of reliably producing larger ink droplets than heretofore thought to be achievable.

A still further object of the invention is to provide an improved drop-on-demand ink jet structure which refills more quickly and reliably following drop expulsion, thereby minimizing any tendency of the jet to de-prime during operation.

The above objects of the invention are given only by way of example. Thus, other advantages and desirable objectives inherently achieved by the disclosed invention may occur to those skilled in the art. Nonetheless, the scope of the invention is to be limited only by the appended claims.

SUMMARY OF THE INVENTION

The above objects and other advantages are achieved by the present invention in which a length of glass capillary tubing is supported in an essentially vertical position while an intermediate location is heated to its softening point. The tubing elongates through a predetermined distance to form two ink jet liners with smoothly converging outlet nozzles. Inlet nozzles are formed by similarly deforming the inlet ends of the liners. Angled outlet orifices are formed by laterally displacing the tubing while it is softened.

BRIEF DESCRIPTION OF THE DRAWINGS

FIG. 4 shows a sectional view of an apparatus according to the present invention for making ink jet liners for use in the embodiments of FIGS. 2 and 3 and also the device of FIG. 1.

FIG. 4A shows a view of two partially completed jet liners, joined at their outlet ends.

FIG. 6 shows a sectional view of an apparatus according to the present invention for making ink jet liners for use in the embodiment of FIG. 5.

DETAILED DESCRIPTION OF THE PREFERRED EMBODIMENT

Figure 1:
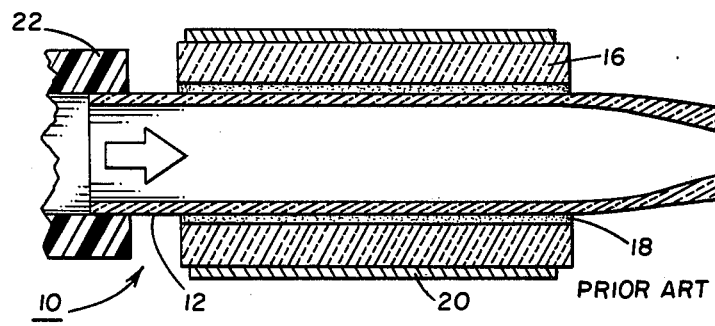
FIG. 1 shows a sectional view through a prior art ink jet device.

The following is a detailed description of the various embodiments of the invention, reference being made to the drawings in which like reference numerals denote like elements of structure in each of the several Figures.

FIG. 1 shows a type of prior art ink jet writing device 10. A cylindrical glass liner 12 is provided with a smoothly converging outlet nozzle or orifice 14 at one end thereof. A cylindrical piezoelectric transducer 16 surrounds liner 12 in stress transmitting engagement therewith. Transducer 16 preferably is joined to liner 12 using the process and solder 18 disclosed in copending application Ser. No. 886,882 filed Mar. 15, 1978 by the present applicant. An electrode 20 is provided on the exterior of transducer 16 so that when a voltage pulse of proper polarity is applied across solder 18 and electrode 20, transducer 16 will contract radially to displace a small droplet of liquid through orifice 14 and then expand to its previous configuration when the voltage pulse has ended. The ink or other liquid to be expelled by the device enters liner 16 from an inlet conduit 22, at substantially atmospheric pressure. Between voltage pulses, the surface tension of the meniscus at nozzle 14 prevents the liquid from just running out of or depriming the ink jet, unless the inlet pressure is too high.

As mentioned previously, experience has shown that performance of ink writing device 10 is optimized when the acoustic impedance of inlet conduit 22 is chosen to be high enough to reduce the backflow of ink to acceptable levels during each voltage pulse. As much as 30 to 40% of the ink within the liner undergoes backflow, according to theoretical analysis. However, if the acoustic impedance is too high, flow of liquid into the jet following the voltage pulse may be so slow that the device will de-prime as the operating frequency is increased. The inlet impedance also is important to minimize acoustic backreflection at the inlet which can deleteriously affect high frequency performance.

Figure 2:
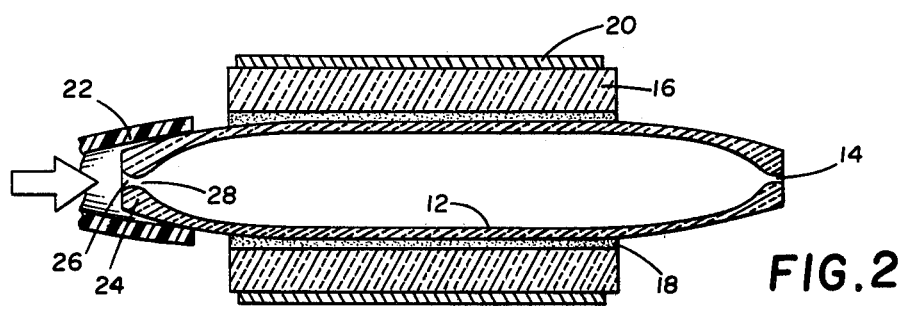
FIG. 2 shows a sectional view through one embodiment of the present invention.

FIG. 2 shows an ink jet writing device according to the present invention which reduces the severity of the problems experienced with prior art devices of the type shown in FIG. 1 and also provides an improvement in frequency response. Liner 12 is provided not only with an outlet orifice 14 as previously discussed, but also with a smoothly flaring integral inlet orifice 24. Orifice 24 is provided just adjacent the inlet end of liner 12 where inlet conduit 22 is forced over liner 12 to deliver ink. Orifice 24 has a slightly outwardly flaring mouth 26 which converges to the throat 28 of the orifice 24. The flow passage then diverges smoothly to meet the nominal inside diameter of cylindrical liner 12. Where capillary tube stock is used having an inner diameter of from 0.024 to 0.028 inch and an outer diameter of from 0.028 to 0.030 inch, inlet orifice 24 or throat 28 (FIG. 3) preferably has a diameter of from 0.0015 to 0.0042 inch; whereas, orifice 14 has a diameter of from 0.0020 to 0.0058 inch.

The device shown in FIG. 2 is relatively free of any tendency to trap air bubbles within transducer 16, due to the smoothly flaring geometry of its inlet orifice 24 and its outlet orifice 14. Sharp edged orifices have been found to trap bubbles and cause operating difficulties. The geometry of the present invention also is considered to be responsible for the improved ability of the jet to refill following expulsion of each droplet. Due to the presence of inlet orifice 24, a high acoustic impedance of inlet conduit 22 no longer needs to be carefully maintained, so that inlet conduits may be used having an inside diameter more than three times greater than that used with the device shown in FIG. 1. In general, the invention of FIG. 2 exhibits little sensitivity to the characteristics of inlet conduit 22. This increased diameter of inlet conduit 22 ensures an accordingly higher flow capacity than heretofore thought to be practical, with the result that the ink jet writing device of FIG. 2 refills more quickly and operates well at higher frequencies. Particularly, the invention of FIG. 2 has been operated quite successfully for printing alphanumerics at up to 10 KHz; whereas, the prior art devices have been found to perform rather poorly above about 4 KHz, though droplets can be formed rather erratically at up to 50 KHz. Another surprising result of including inlet orifice 24 is that the overall size of the device can be reduced considerably with no appreciable reduction in performance. For example, the prior art device of FIG. 1 typically comprises a liner 12 at least three-quarters of an inch long and a transducer 16 about one-half inch long. The present invention, however, operates well with liners as short as three-tenths of an inch and transducers as short as one-tenth or an inch. This remarkable reduction in size without a corresponding reduction in performance is not fully understood; however, it appears that the presence of inlet orifice 24 reduces backflow and acoustic backreflection during pulsing so that a smaller transducer is practical; and yet the larger inlet conduit 22 permits quicker refill in spite of the presence of orifice 24. In another actual embodiment of the invention of FIG. 2, liner 12 had a length of 0.500 inch; inlet orifice 24, a diameter of 0.002 inch; outlet orifice 14, a diameter of 0.003 inch; and transducer 16, a length of 0.350 inch. This device worked well with 22 volt pulses, up to 5 KHz with deflection of droplets. The jets made in accordance with FIG. 2 also have a rather unusual ability in that they can be run with the liquid flow in either direction, producing different diameter droplets depending on which orifice is used as the outlet. Droplets up to about 0.005 inch in diameter have been achieved, compared to about 0.002 inch maximum with the device of FIG. 1.

Figure 3:
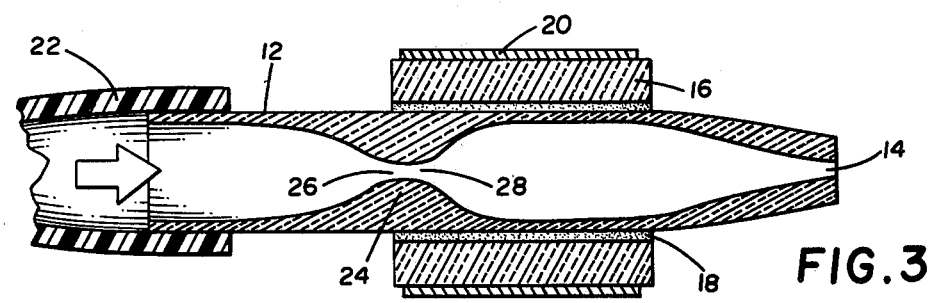
FIG. 3 shows a sectional view through another embodiment of the present invention.

FIG. 3 shows a modified version of the ink jet writing device illustrated in FIG. 2. In this embodiment, inlet orifice 24 converges from the nominal inner diameter of liner 12 until throat 28 is reached and then diverges to meet the nominal inside diameter of liner 12, thus forming a converging-diverging nozzle or orifice 24 at an intermediate location on liner 12, rather than at the inlet as in FIG. 2. Transducer 16 is sized so that its upstream end is radially outside throat 28, thereby confining the volume of liquid to be acted upon by the transducer between orifices 14 and 24. An upstream section of liner 12 retains its cylindrical configuration and acts both as a convenient coupling for inlet conduit 22 and, on its interior, as a smooth transition from the full diameter of the liner to the inlet orifice 24. In one actual embodiment of the invention illustrated in FIG. 3, the overall length of liner 12 was three-quarters of an inch; the transducer was one-half inch long; and orifice 24 was located approximately two-tenths of an inch in from the inlet end of liner 12. The inlet orifice had a diameter of about 0.0015 inch; and the outlet orifice, a diameter of about 0.0043 inch. Outlet orifices as large as 0.0058 inch have been tested and found quite adequate. In such cases, the inlet orifice ranged up to about 0.0042 inch in diameter but was always smaller than the outlet orifice. Droplet diameters of up to 0.005 inch have been achieved reliably.

FIG. 4 shows an elevation view of the apparatus according to the invention which is used to make the embodiments of FIGS. 2 and 3 and may also be used to make the jet liner for the device shown in FIG. 1. This apparatus was developed by applicant after long experience with suppliers of tiny glass capillary tubing showed an apparent inability among those skilled in the art to make jet liners having repeatable outlet orifice geometry. The disclosed apparatus has been used extensively to make the various types of liners just mentioned, with better than 90% repeatability.

A base 30 of suitable material such as aluminum is provided with a stepped recess having an annular support surface 32 and a concentric circular support surface 34. A rigid metal barrel or hollow cylinder 36 is snugly received on support surface 32 and closely surrounds a solid metal cylinder 38 which, in turn, rests on support surface 34. Cylinder 38 is provided with a concentric counterbore 40 at its upper end which snugly receives an axially movable metal support cylinder 42. Support cylinder 42 is provided with an accurately machined concentric counterbore 44 which is approximately 0.001 inch larger in diameter than the capillary glass tubing to be used to make the jet liners for the devices shown in FIGS. 1 to 3. An access and viewing port 46 is provided through the wall of barrel 36. A cap 48 having a boss 50 sized to fit snugly within barrel 36 rests on the upper end of the barrel. A through bore 52 in cap 48 is provided in precise coaxial alignment with counterbore 44 in support cylinder 42. An access and viewing port 54 is provided in cap 48. A heating coil 56 is supported within barrel 36 and also is in precise coaxial alignment with the counterbore 44. Coil 56 preferably is made from Nichrome wire or the like and comprises a symmetrical truncated hourglass shape having top and bottom openings 58,60 approximately 0.081 inch in diameter and a central throat region 62 approximately 0.059 inch in diameter. Power to heating coil 56 is provided from a suitable source 64 controlled by a rheostat or similar device 66 and a timer 68.

In use, the apparatus of FIG. 4 is assembled as illustrated. A length 70 of glass capillary tubing is selected and is cut to a length about twice that desired for a typical glass liner 12, say 1.5 inches, plus about 0.5 inch for handling. A thin disc 72 of resilient material such as rubber is provided with a small puncture hole through which length 70 is inserted so that, for example, 1.5 inches of tubing project below the disc. Length 70 is then inserted carefully through bore 52, throat region 62 and into counterbore 44, terminating a short distance, say 0.1 inch, above the bottom of counterbore 44. Of course, support cylinder 42 would previously have been moved axially within counterbore 40 to ensure that the lower end of length 70 is properly positioned. Throat region 62 would be located at the center of the 1.5 inch segment. Rheostat 66 is set to the appropriate power setting. Timer 68 is then activated to begin the orifice formation process. Heating coil 56 quickly glows a dull red to indicate that the capillary tubing is being heated and, as the tubing material becomes sufficiently softened, the lower end of length 70 descends to the bottom of counterbore 44. Timer 68 shuts off power to heating coil 56, leaving two symmetrical nozzles formed in length 70, still joined to each other at about the center of length 70, as shown in FIG. 4A.

Selection of the power level to be applied to heating coil 56, the time period of application and the distance through which length 70 is allowed to drop in counterbore 44 will depend upon the dimensions and material of the capillary tubing and the desired size of exit orifice 14. By allowing length 70 to drop a greater or a lesser distance, more or less reduction in inner diameter is achieved. Similarly, applying heat for varying periods will effect the resultant orifice geometry. In one actual, typical use of the apparatus of FIG. 4, timer 68 was set to 4.5 seconds and rheostat 66, at 95 volts. Occasionally, the process must be repeated to produce the desired orifice geometry, but the time and power settings are conveniently determined for each batch of capillary tubing after a few test runs.

The length of tubing having two joined nozzles as shown in FIG. 4A, is then removed from the apparatus. A heated mixture of low melting point wax and black ink is then drawn into the tubing to provide a clear contrast between the glass of the tubing and its bore, which facilitates cutting the tubing into two separate ink jet liners. The cutting is done at about point 74 in FIG. 4A so that two perfectly formed ink jet liners are produced. The ends of the liners are then lapped to remove rough edges. Finally, the wax and ink mixture is removed in boiling distilled water followed by a three to five minute hot soak in a 50/50 solution of sodium hydroxide and distilled water. After heating the liners to dry them, assembly of the ink jets themselves may proceed.

The apparatus of FIG. 4 thus may be used to reliably produce ink jet liners for use in writing devices of the type shown in FIG. 1. It may also be used to produce liners for the devices shown in FIGS. 2 and 3. To produce the liner 12 shown in FIG. 2, heating coil 56 is replaced by a smaller, preferably two-turn coil having a diameter of about 0.059 inch (not shown). Support cylinder 42 is moved axially so that when a liner of the type shown in FIG. 1 is inserted with the tip having orifice 14 in contact with the bottom of counterbore 44, then the other end of the liner is located within the two turn coil. Rheostat 66 and timer 68 are then adjusted so that the inlet end of the liner is heated for a short time. This causes the glass tubing to soften and form into a symmetrical inlet orifice 24, due to the combined effects of gravity and surface tension of the molten glass. The inlet end is then lapped to remove roughness, and the liner is completed.

To produce the liner 12 shown in FIG. 3, a two turn coil is also used. Support cylinder 42 is moved axially so that when a liner of the type shown in FIG. 1 is inserted with the tip having orifice 14 in contact with the bottom of counterbore 44, then the other end of the liner is located just within the lower portion of bore 52. An intermediate location on liner 12 is heated until the glass softens, thus permitting the upper portion of the liner to settle slightly and form the orifice 24. The ends of the liner are then lapped to complete the process.

Figure 5:
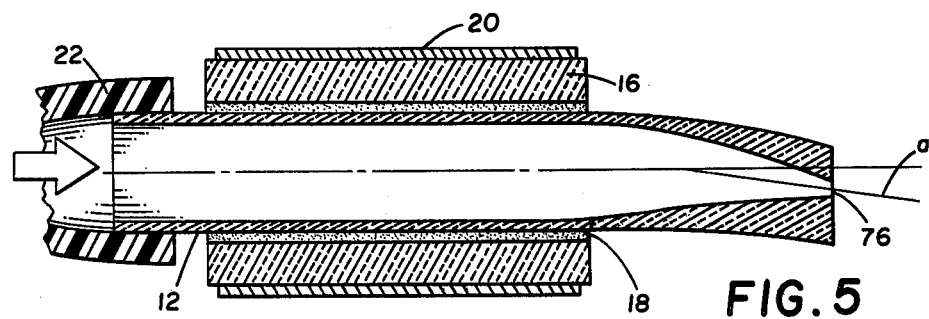
FIG. 5 shows a sectional view through still another embodiment of the present invention.

FIG. 5 shows another embodiment of the invention in which liner 12 is provided with an outlet orifice 76 which is offset at angle "a" from the cylindrical axis of transducer 16. Such an ink jet assembly has been used in arrays of jets, the angle of the jet facilitating grouping several jets into a compact arrangement not easily achieved with the straight geometries of FIGS. 1 to 3. The embodiment of FIG. 5 is made using the apparatus shown in FIG. 6, which is a modification of the apparatus shown in FIG. 4. Here, a length of tubing 70, which may already have had two joined orifices formed as in FIG. 4A, is inserted through coil 56 and into a short counterbore 78 provided in a laterally oriented bending bar 80 which is arranged to slide through a pair of diametrically opposed openings in barrel 36 so that counterbore 78 may be aligned with bore 52. If length 70 has not had the joined orifices formed previously, its lower end is positioned a short distance above the bottom of counterbore 78 and the orifices are formed as previously described, except that while the glass is still molten, bending bar 80 is moved laterally by an amount fixed by stops 82,84 to produce the desired bend in the axis of the jet liners. If the joined orifices have been formed previously, then the lower end of the length 70 is bottomed in counterbore 78, the region of the joined orifices is heated and the assembly is bent as previously described. Following bending, the two liners are separated and cleaned. Those skilled in the art will appreciate that jet liners having such an offset tip may also be provided with an inlet orifice 24 without departing from the spirit of the present invention.

Having described my invention in sufficient detail to enable those skilled in the art to make and use it, I claim:

1. A method for forming nozzles or orifices in capillary glass tubing, comprising the steps of;
   supporting a predetermined length of said tubing in an essentially vertical orientation;
   heating said tubing at an intermediate location therealong until its walls soften and said tubing elongates downwardly due to gravity;
   stopping elongation of said tubing upon movement of the lower end thereof through a predetermined distance;
   cutting said tubing in the region of elongation to form two capillary tubes having smoothly converging nozzles;
   supporting one of said two capillary tubes previously provided with a smoothly converging nozzle, in an essentially vertical position;
   heating said one capillary tube at an intermediate location therealong until its walls soften and said one capillary tube elongates downwardly due to gravity; and
   stopping elongation of said one capillary tube upon movement of the lower end thereof through a predetermined distance;
   whereby a capillary tube having a converging-diverging inlet orifice and a smoothly converging outlet nozzle is formed.

2. A method for forming nozzles or orifices in capillary glass tubing, comprising the steps of;
   supporting a predetermined length of said tubing in an essentially vertical orientation;
   heating said tubing at an intermediate location therealong until its walls soften and said tubing elongates downwardly due to gravity;
   stopping elongation of said tubing upon movement of the lower end thereof through a predetermined distance;
   cutting said tubing in the region of elongation to form two capillary tubes having smoothly converging nozzles;
   supporting one of said two capillary tubes previously provided with a smoothly converging nozzle, in an essentially vertical position with its nozzle downward; and
   heating said one capillary tube at its other end until its walls soften and deform radially inwardly to form an inlet orifice;
   whereby a capillary tube having an inlet orifice and a smoothly converging outlet nozzle is formed.

3. A method for forming nozzles or orifices in capillary glass tubing, comprising the steps of:
   supporting a predetermined length of said tubing in an essentially vertical orientation;
   heating said tubing at an intermediate location therealong until its walls soften and said tubing elongates downwardly due to gravity;
   stopping elongation of said tubing upon movement of the lower end thereof through a predetermined distance;
   cutting said tubing in the region of elongation to form two capillary tubes having smoothly converging nozzles; and
   moving the lower end of said tubing laterally while its walls are soft, to form, following said cutting, two capillary tubes having bent or deflected outlet nozzles.

* * * * *